(12) United States Patent
Di Rienzo et al.

(10) Patent No.: US 11,839,289 B2
(45) Date of Patent: Dec. 12, 2023

(54) ENCLOSURE FOR MODULE

(71) Applicant: One Health Group, Inc., Cazenovia, NY (US)

(72) Inventors: Albert Di Rienzo, Herndon, VA (US); Bill Welch, Sunnyvale, CA (US); Kevin Matthew Limtao, Dobbs Ferry, NY (US)

(73) Assignee: One Health Group, Inc., Cazenovia, NY (US)

( * ) Notice: Subject to any disclaimer, the term of this patent is extended or adjusted under 35 U.S.C. 154(b) by 0 days.

(21) Appl. No.: 17/575,055

(22) Filed: Jan. 13, 2022

(65) Prior Publication Data

US 2023/0218068 A1 Jul. 13, 2023

(51) Int. Cl.
*A45F 5/00* (2006.01)
*A01K 27/00* (2006.01)

(52) U.S. Cl.
CPC .............. *A45F 5/00* (2013.01); *A01K 27/006* (2013.01); *A45F 2200/0525* (2013.01)

(58) Field of Classification Search
CPC .............. Y10S 224/93; Y10S 224/908; A45F 2200/0516; A45F 2200/0508; A45F 2200/0533
USPC ................................ 224/250, 222, 930, 587
See application file for complete search history.

(56) References Cited

U.S. PATENT DOCUMENTS

| | | | | |
|---|---|---|---|---|
| 4,387,838 A | * | 6/1983 | Jackson | A44C 5/14 2/160 |
| 4,545,370 A | * | 10/1985 | Welsh | A63B 23/0244 128/95.1 |
| 5,623,731 A | * | 4/1997 | Ehrgott | A41D 19/0037 2/160 |
| 7,175,340 B1 | * | 2/2007 | Kinney | G04B 37/1486 368/286 |
| 8,016,492 B2 | * | 9/2011 | Pyle | G03B 17/00 224/222 |

* cited by examiner

*Primary Examiner* — Adam J Waggenspack
(74) *Attorney, Agent, or Firm* — Banner & Witcoff, Ltd.

(57) ABSTRACT

A flexible structure for holding an electronics module is disclosed. The flexible structure may comprise various straps and/or an elastomeric enclosure. The flexible structure may include one or more apertures configured to securely hold one or more raised portions of the electronics module.

10 Claims, 17 Drawing Sheets

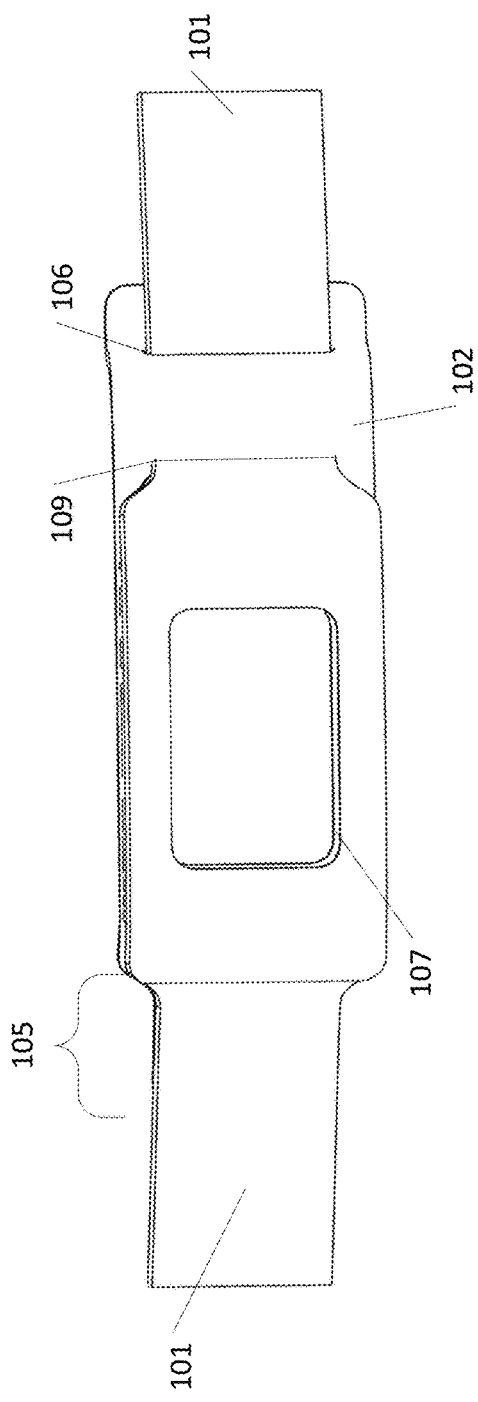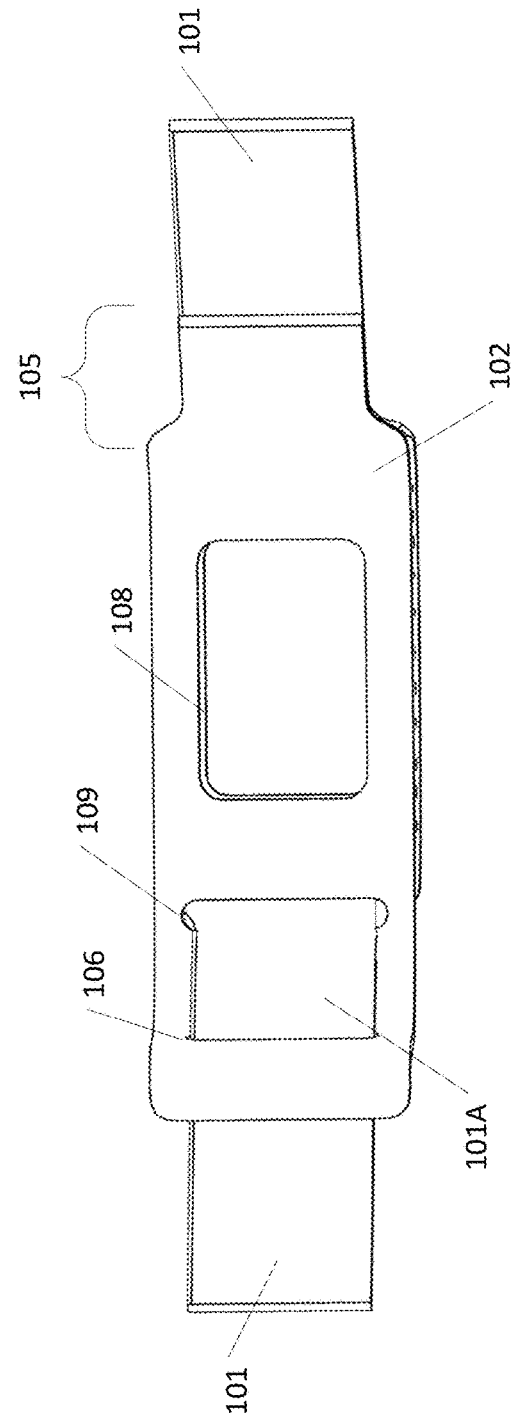
Figure 2A
Figure 2B

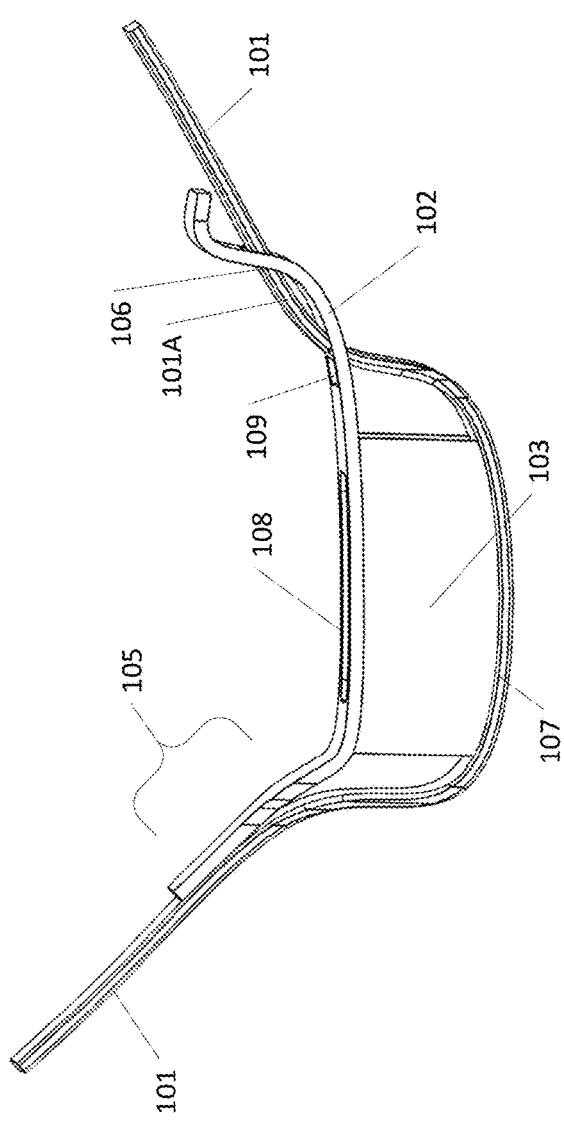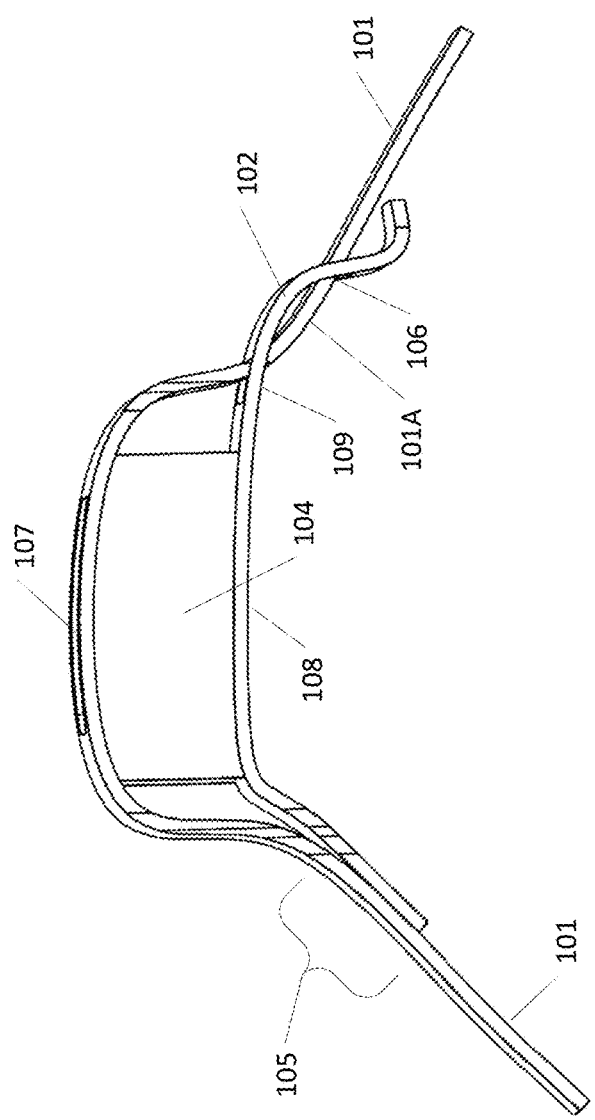

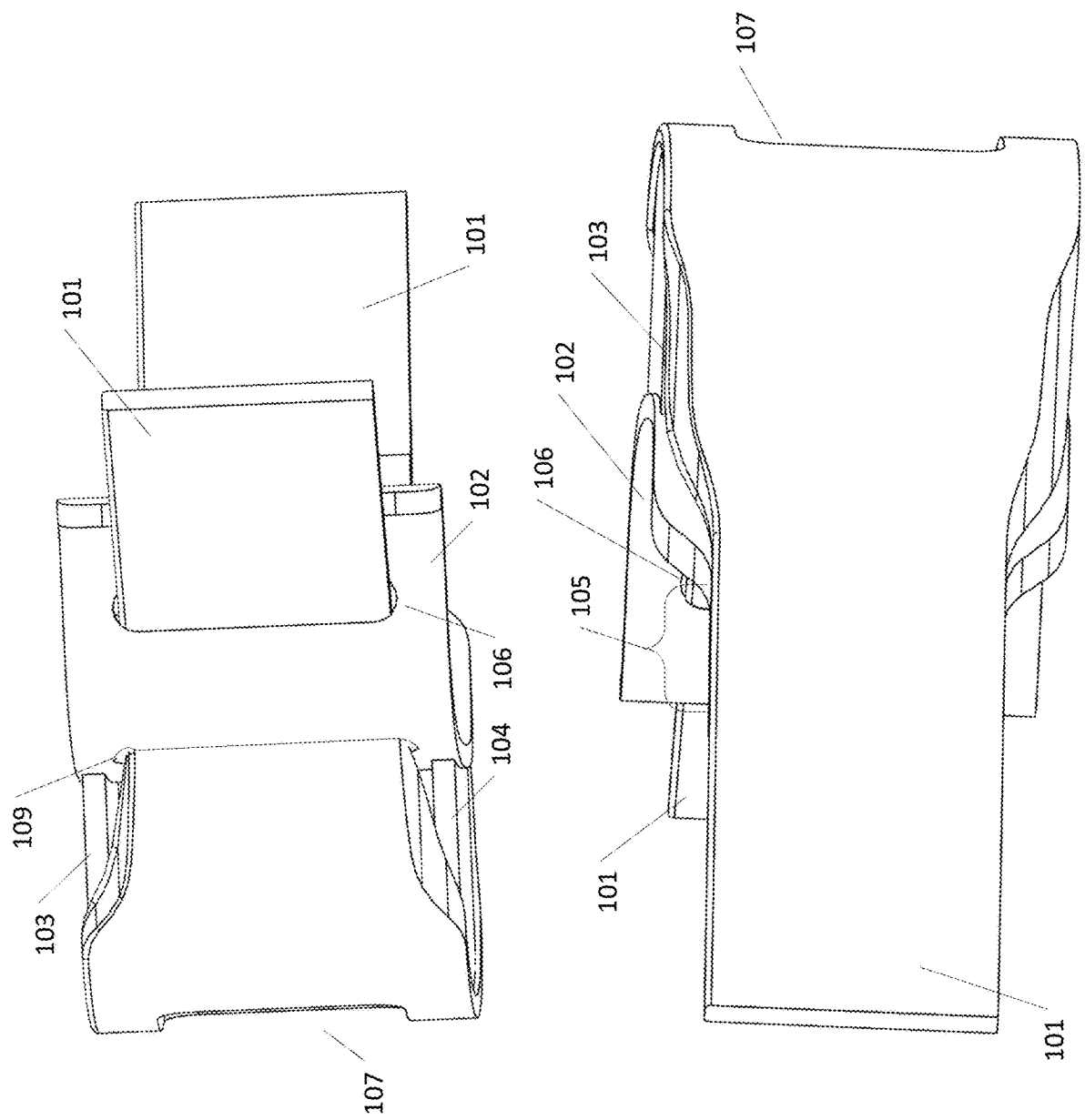

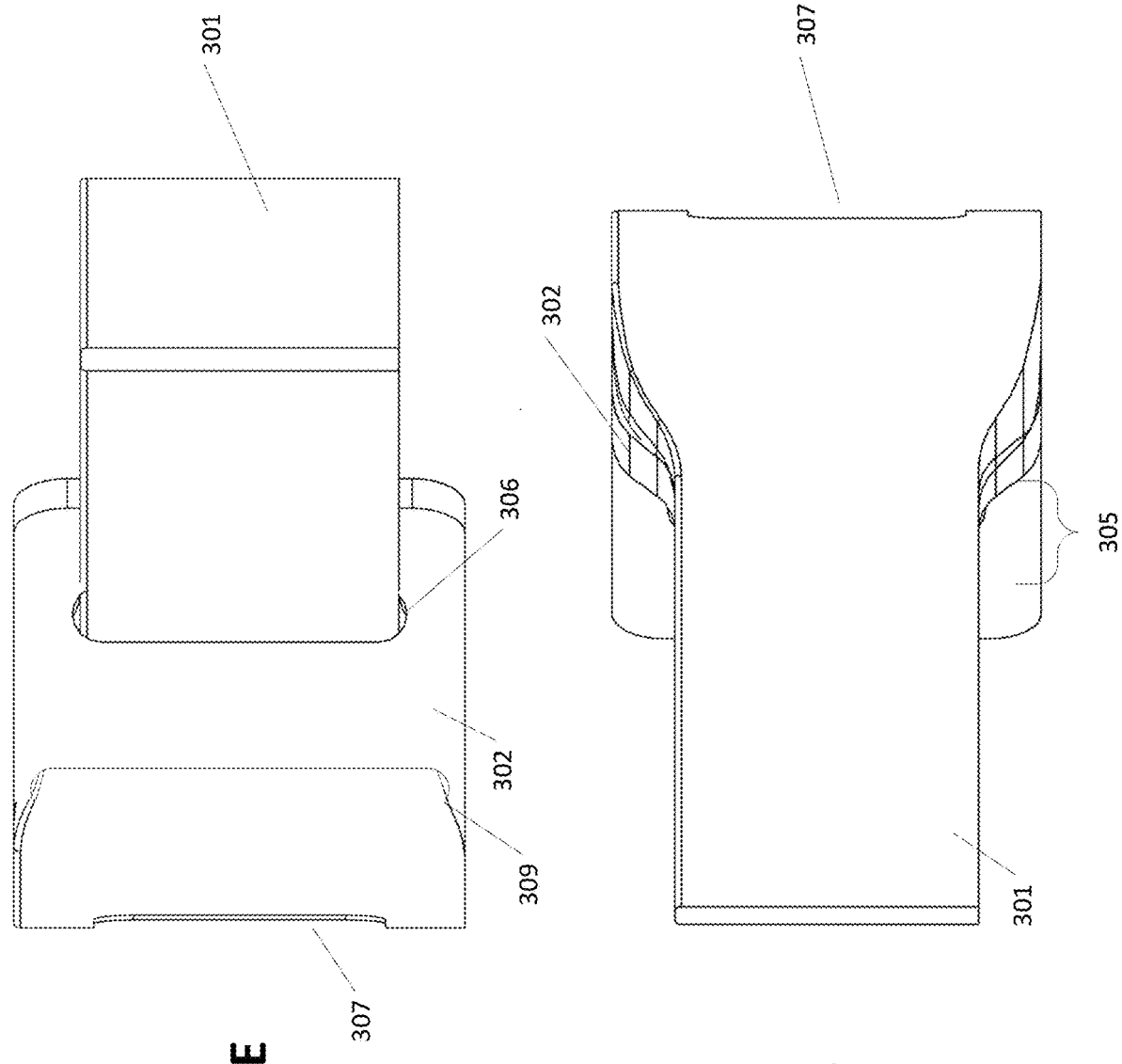

ENCLOSURE FOR MODULE

TECHNICAL FIELD

One or more aspects of the disclosure relate generally to securely holding electronics module.

BACKGROUND

Belts, harnesses, and collars are examples of flexible structures that hold one item relative to another. Electronic modules may be inserted into these flexible structures to position the modules relative to an area of a person or animal wearing the flexible structure. The designs of the flexible structures are often results of compromises between securely holding the modules (at high manufacturing costs) and insecurely holding the modules (at low manufacturing costs).

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

One or more aspects of this disclosure relate to securely positioning and electronics module in a flexible structure to be worn by a subject These features, along with many others, are discussed in greater detail below.

BRIEF DESCRIPTION OF DRAWINGS

The present disclosure is illustrated by way of example and not limited in the accompanying figures in which like reference numerals indicate similar elements and in which:

FIGS. 2A-2F depict various perspectives of the first embodiment;

FIGS. 4A-4F depict various perspectives of the second embodiment;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software. In addition, terms such as " . . . unit", " . . . module" described in the specification mean a unit for performing at least one function or operation, which may be implemented as hardware or software, or as a combination of hardware and software. Throughout the specification, the expression "at least one of a, b, and c" may include 'a only', 'b only', 'c only', 'a and b', 'a and c', 'b and c', and/or 'all of a, b, and c'. The expression "at least one of a, b, or c" may include 'a only', 'b only', 'c only', 'a and b', 'a and c', 'b and c', and/or 'all of a, b, and c'. Similarly, the expression "one or more of a, b, and c" may include 'a only', 'b only', 'c only', 'a and b', 'a and c', 'b and c', and/or 'all of a, b, and c'. The expression "one or more of a, b, or c" may include 'a only', 'b only', 'c only', 'a and b', 'a and c', 'b and c', and/or 'all of a, b, and c'.

By way of introduction, aspects of the disclosure relate to securely positioning and electronics module in a flexible structure configured to be worn close to a body or limb of a subject. While a completely rigid structure may provide the most security in preventing loss of the electronics module, the rigid structure may be uncomfortable for long term whereby the subject. As described herein, one or more portions of the structure for positioning the electronics module may comprise a flexible material configured to deform while the structure continues to maintain the position of the module.

Figure 1:
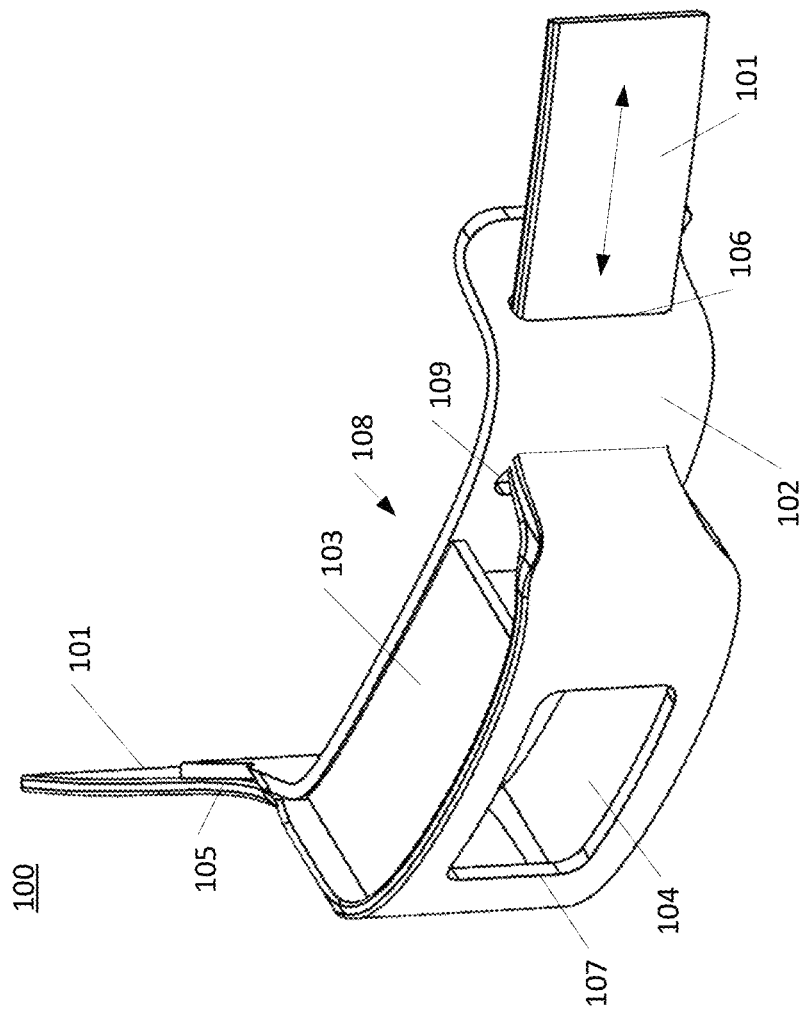
FIG. 1 shows a first embodiment of a portion of a flexible structure configured to position an insertable module.

FIG. 1 shows a first embodiment of a portion of a flexible structure configured to position an insertable module. The flexible structure 100 may comprise a first strap 101 that extends around a body or limb of a subject. The flexible structure may also comprise a second strap 102 that is attached to the first strap 101 at, for example, location 105. The first strap 101 and the second strap 102 may be attached together by various means including, but not limited to, glue, stitching, welding, melting, and the like. In FIG. 1, the flexible structure may further comprise an upper panel 103 and a lower panel 104. Various ends of the upper panel 103 and/or lower panel 104 may be fixedly attached to one or more of the first strap 101 and/or the second strap 102. While one end of the second strap 102 may be fixedly attached to the first strap 101, the other end may comprise one or more apertures (e.g. apertures 106 and 109 in FIG. 1) through which the first strap 101 may be threaded. In the example of FIG. 1, two apertures 106 and 109 are shown. When used together, the pair of apertures permit each of the first strap 101 and the second strap 102 to both start and end in the same relative position with respect to each other. For instance, before and after the apertures 106 and 109, the second strap 102 may be referred to as inside the first strap 101, while between the apertures 106 and 109 the second strap 102 may be referred to as outside the first strap 101. While not shown, it is appreciated that adding a third aperture, removing one of the first or second apertures, or even not using one of the first or second apertures may result in the first strap 101 and the second strap 102 starting with one set of sides next to each other and ending with a different set of sides next to each other.

The first strap 101 and the second strap 102 may be the same length. Alternatively, the second strap, as shown in FIG. 1, may be shorter than the length of the first strap 101. Further, while the apertures 106 and 109 are shown in the second strap 102, it is appreciated that the apertures may be in the first strap 101 or occur in each strap. As shown in FIG. 1, a width of the first strap 101 may be the same as the width of the second strap 102 near where the first strap 101 and the second strap 102 are attached to each other at location 105 and have a different with relative to each other near the apertures, thereby permitting at least one of the first strap 101 or the second strap 102 to be threaded through the other.

The structure 100 of FIG. 1 may further comprise one or more apertures configured to permit a portion of electronics module (not shown in FIG. 1) to engage with at least a portion of a periphery of the apertures. As shown in FIG. 1, a portion of the first strap 101, near the upper and lower panels 103 and 104, may include an aperture 107. Additionally and/or alternatively, a portion of the second strap 102, near the upper and lower panels 103 and 104, may include an aperture 108.

A space between the first strap 101 and the second strap 102 and also between the panels 103/104 and the aperture 109 may be increased in size by pushing an end of the first strap 101 through apertures 106 and 109. The space may be enlarged enough to permit insertion of electronics module between the panels 103 and 104 and between the straps 101 and 102 with at least one portion of the electronics module engaging with a periphery of one of apertures 107 and/or 108. One or more of the panels 103 and/or 104 may comprise an elastic material. Additionally or alternatively, one or more of the panels 103 and/or 104 may comprise an inelastic material.

FIGS. 2A-2F depict various perspectives of the first embodiment. FIG. 2A shows a front perspective of the structure 100, depicting the first strap 101, the second strap 102, the apertures 106, 107, and 109, and a region 105 where the first strap 101 and the second strap 102 may be attached to each other. FIG. 2B shows a rear perspective of the structure 100, depicting the first strap 101, the second strap 102, the apertures 106, 108, and 109, and the region 105 where the first strap 101 and the second strap 102 may be attached to each other. FIG. 2B also shows a portion 101A of the first strap 101, between the apertures 106 and 109, that is closer to the subject than second strap 102.

FIG. 2C shows a top perspective of the structure 100, depicting the first strap 101, the second strap 102, the apertures 106, 107, 108, and 109, and the region 105 where the first strap 101 and the second strap 102 may be attached to each other. FIG. 2C also shows upper panel 103 and the portion 101A of strap 101 on an opposite side of strap 102. FIG. 2D shows a bottom perspective of the structure 100, depicting the first strap 101, the second strap 102, the apertures 106, 107, 108, and 109, and the region 105 where the first strap 101 and the second strap 102 may be attached to each other. FIG. 2D also shows the lower panel 104 and the portion 101A of the first strap 101, between the apertures 106 and 109, that is inside the second strap 102.

FIG. 2E shows a perspective from one side of the flexible structure 100, showing the first strap 101, the second strap 102, the apertures 106, 107 and 109, the upper panel 103, and the lower panel 104. FIG. 2F shows a perspective from another side of the flexible structure 100, showing the first strap 101, the second strap 102, region 105, the apertures 106, 107 and 109, and the upper panel 103.

Figure 3:
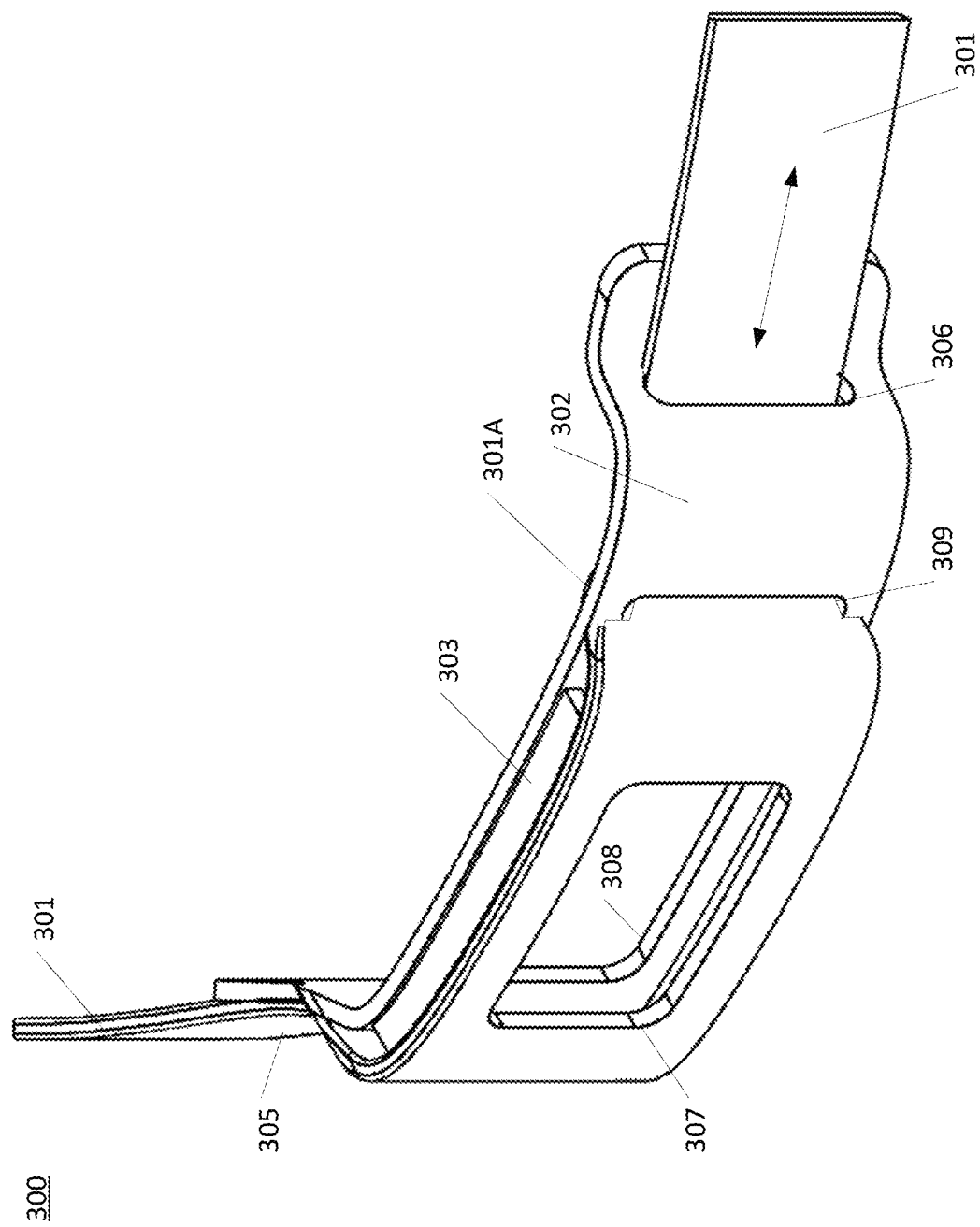
FIG. 3 shows a second embodiment of a portion of a flexible structure configured to position the insertable module.

FIG. 3 shows a second embodiment of a portion of a flexible structure configured to position the insertable module. FIG. 3 includes a first strap 301, a second strap 302, apertures 306 and 309, through which the first strap 301 is threaded through the second strap 302, a portion 305 where the first strap 301 and the second strap 302 are fixed the attached together, a front aperture 307, and a rear aperture 308. As shown in FIG. 3, upper panel 303, positioned between the first strap 301 and the second strap 302, near apertures 307 and 308, is smaller than a corresponding upper panel 103 of FIGS. 1 and 2A-2F.

In the second embodiment shown in FIG. 3, the upper panel 303 may further be removed, instead relying on one or more apertures 307 and/or 308 and tension in strap 301 to adequately position a module between the first strap 301 and the second strap 302. For instance, a space between the first strap 301 and the second strap 302 and also between the panels 303/304 and the aperture 309 may be increased in size by pushing an end of the first strap 301 through apertures 306 and 309. The space may be enlarged enough to permit insertion of electronics module between the panels 103 and 104 (if present) and between the straps 101 and 102 with at least one portion of the electronics module engaging with a periphery of one of apertures 107 and/or 108. The panels 303 and/or 304 (if present) may comprise an elastic material.

Figure 4A:
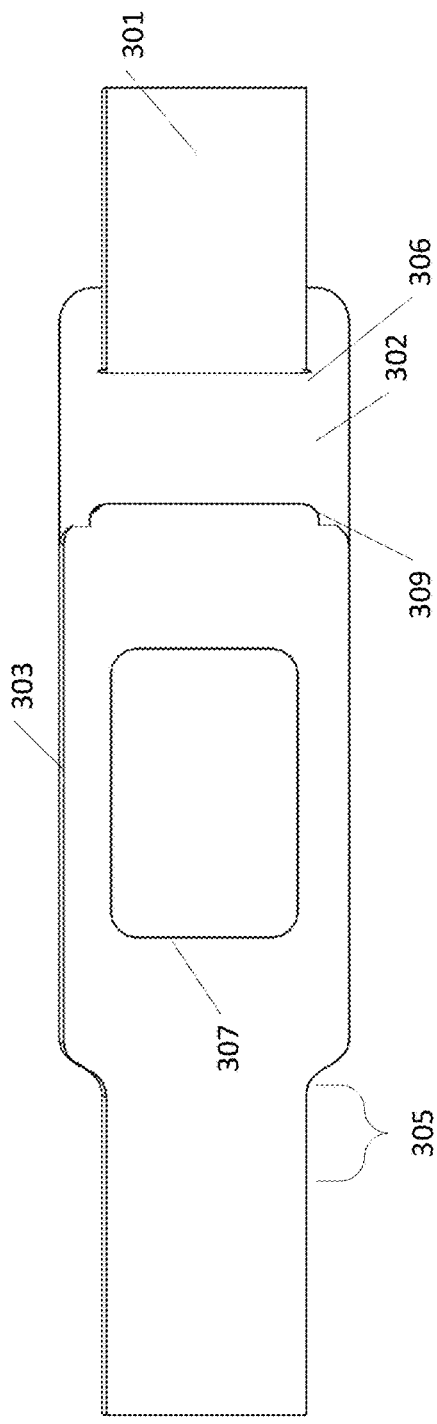
Figure 4B:
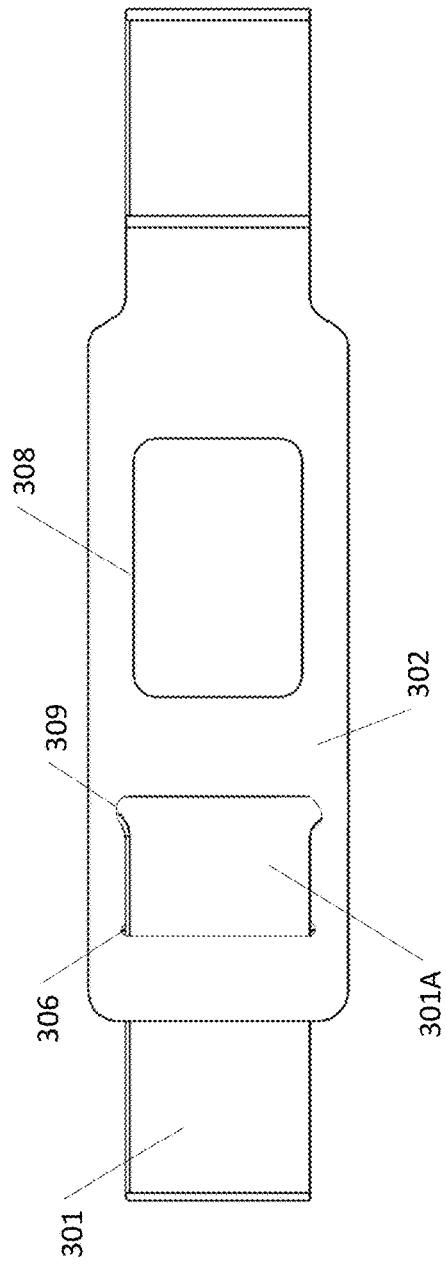

FIGS. 4A-4F depict various perspectives of the second embodiment. FIG. 4A shows a front perspective of the structure 300, depicting the first strap 301, the second strap 302, the apertures 306, 307, and 309, and a region 305 where the first strap 301 and the second strap 302 may be attached to each other. FIG. 4B shows a rear perspective of the structure 300, depicting the first strap 301, the second strap 302, the apertures 306, 308, and 309, and the region 305 where the first strap 301 and the second strap 302 may be attached to each other. FIG. 4B also shows a portion 301A of the first strap 301, between the apertures 306 and 309, that is closer to the subject than second strap 302.

Figure 4C:
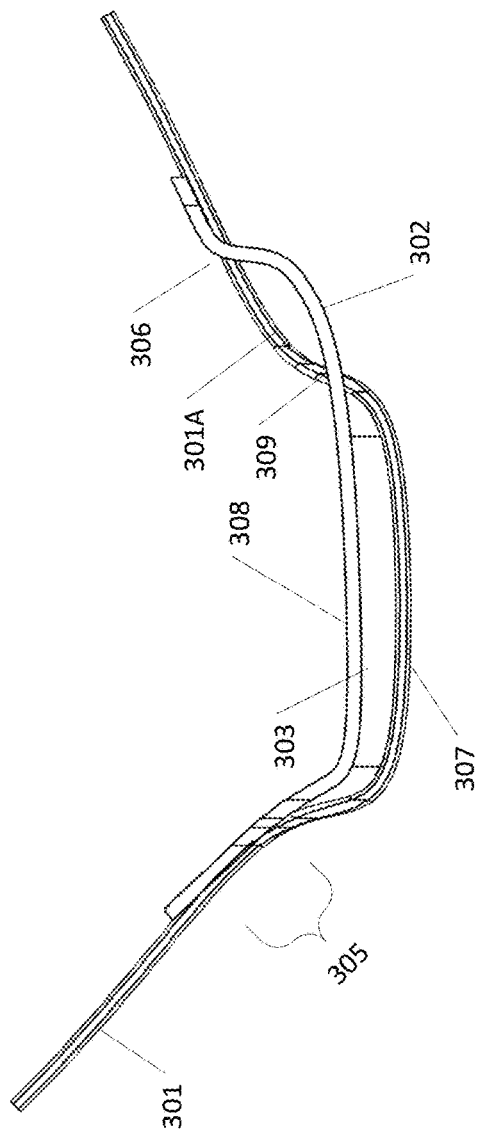
Figure 4D:
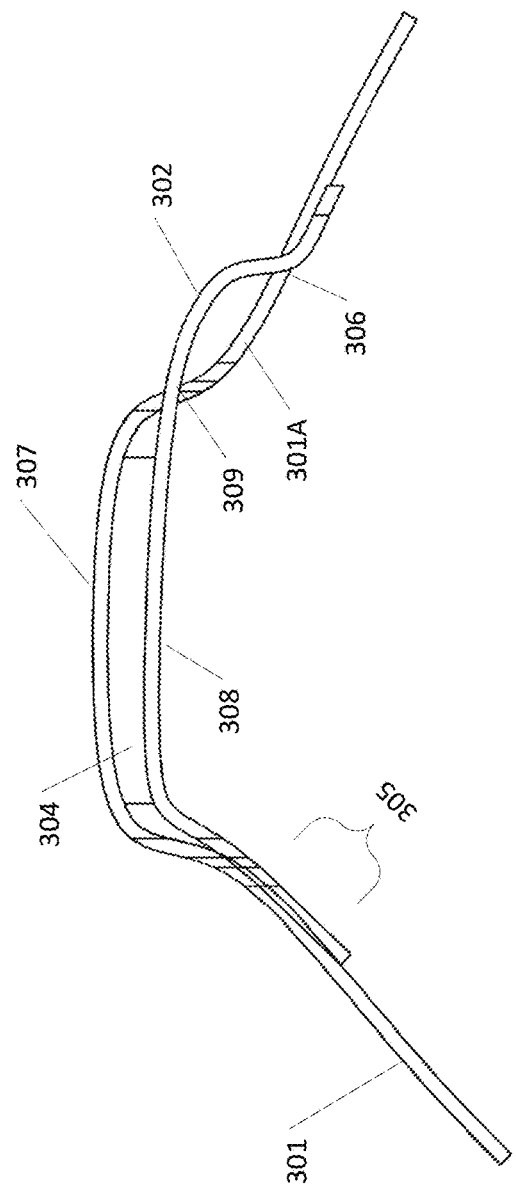

FIG. 4C shows a top perspective of the structure 300, depicting the first strap 301, the second strap 302, the apertures 306, 307, 308, and 309, and the region 305 where the first strap 301 and the second strap 302 may be attached to each other. FIG. 4C also shows upper panel 303 and the portion 301A of strap 301 on an opposite side of strap 302. FIG. 4D shows a bottom perspective of the structure 300, depicting the first strap 301, the second strap 302, the apertures 306, 307, 308, and 309, and the region 305 where the first strap 301 and the second strap 302 may be attached to each other. FIG. 4D also shows the lower panel 304 and the portion 301A of the first strap 301, between the apertures 306 and 309, that is inside the second strap 302.

FIG. 4E shows a perspective from one side of the flexible structure 300, showing the first strap 301, the second strap 302, and the apertures 306, 307 and 309. FIG. 4F shows a perspective from another side of the flexible structure 300, showing the first strap 301, the second strap 302, region 305, the aperture 307.

Figure 5:
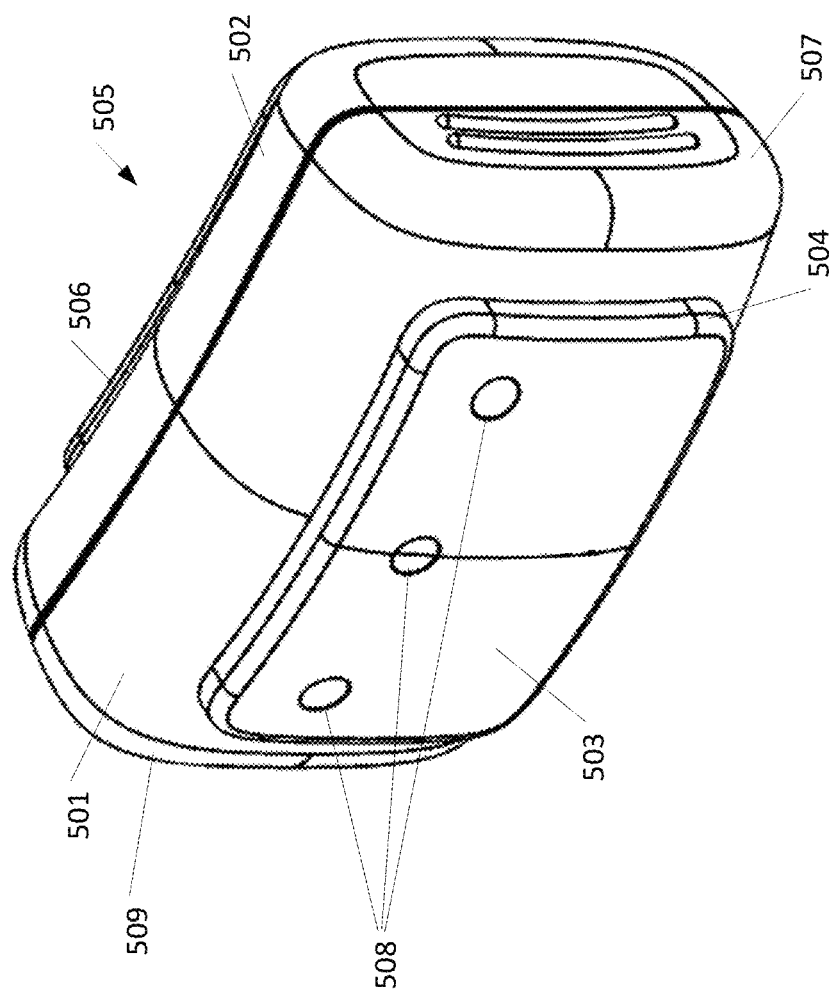
FIG. 5 shows an example of the electronics module.

FIG. 5 shows an example of the electronics module. The electronics module may comprise a front portion 501 and a rear portion 502. The front portion 501 may include a raised region 503 that extends outward from the surface of the front portion 501 by edge 504. The electronics module may also include one end 507 and an opposite end 509. The electronics module may further comprise one or more indicator lights 508 that may be exposed through apertures 107 and/or 307.

Figure 6A:
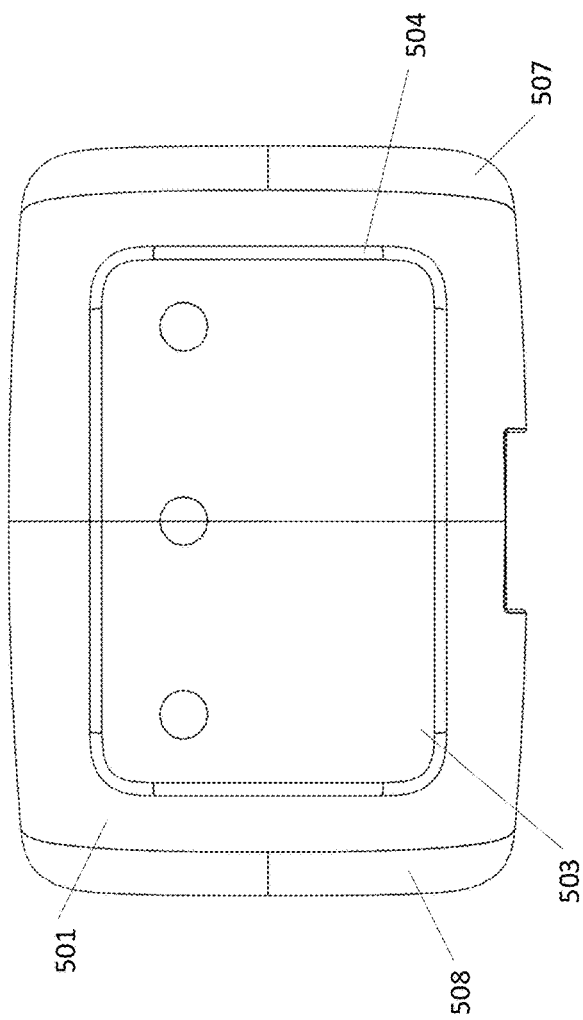
FIGS. 6A-6F depict various perspectives of the electronics module.
Figure 6B:
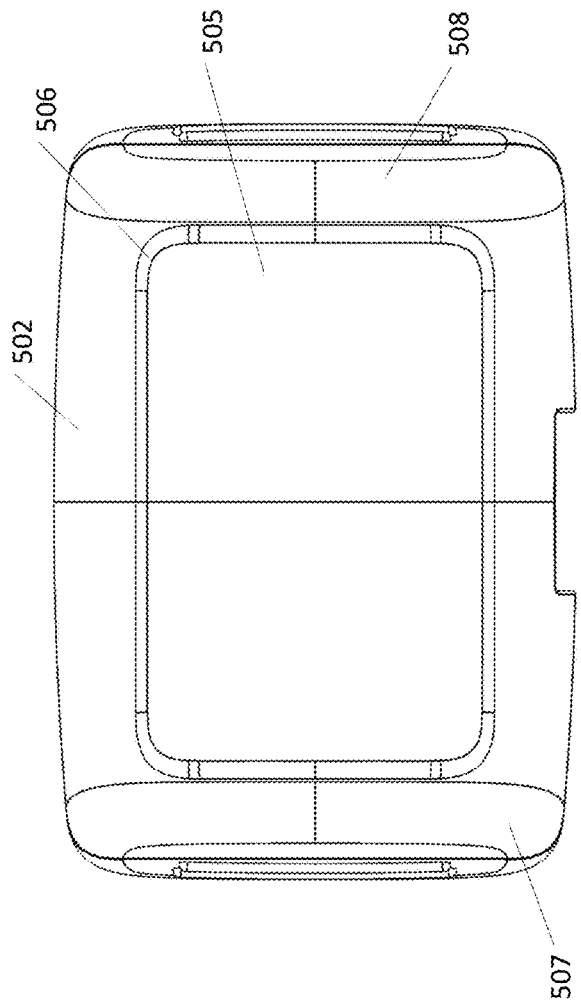
Figure 6C:
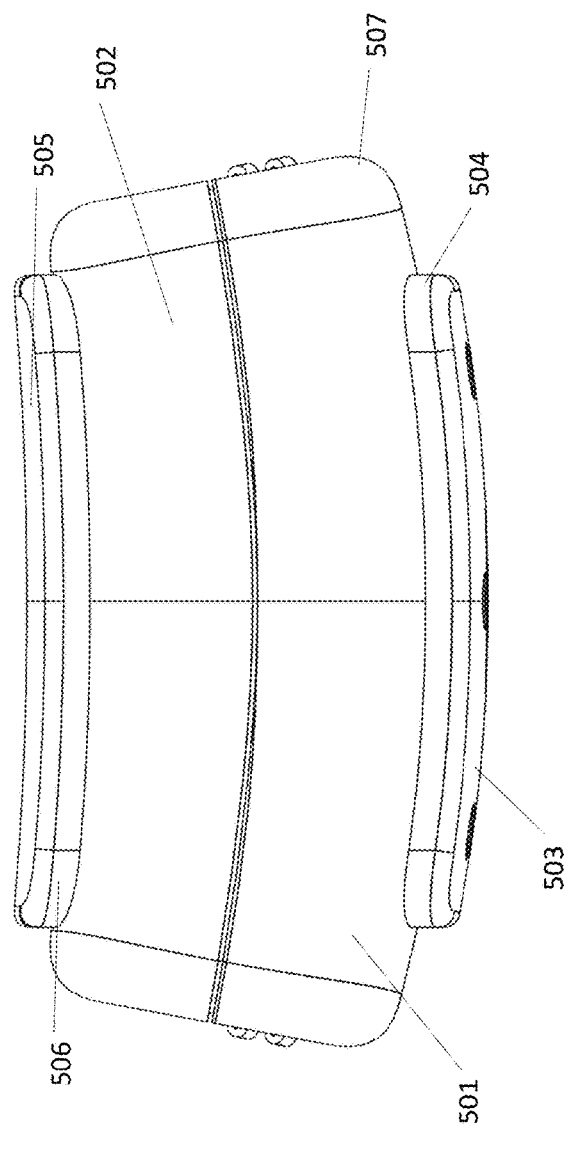
Figure 6D:
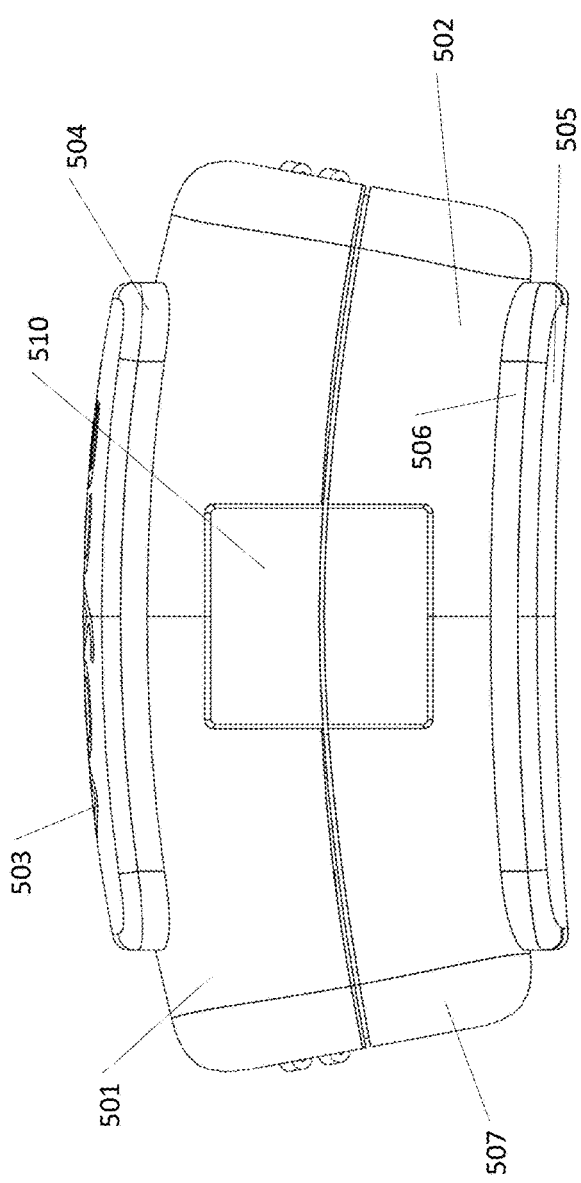
Figure 6F:
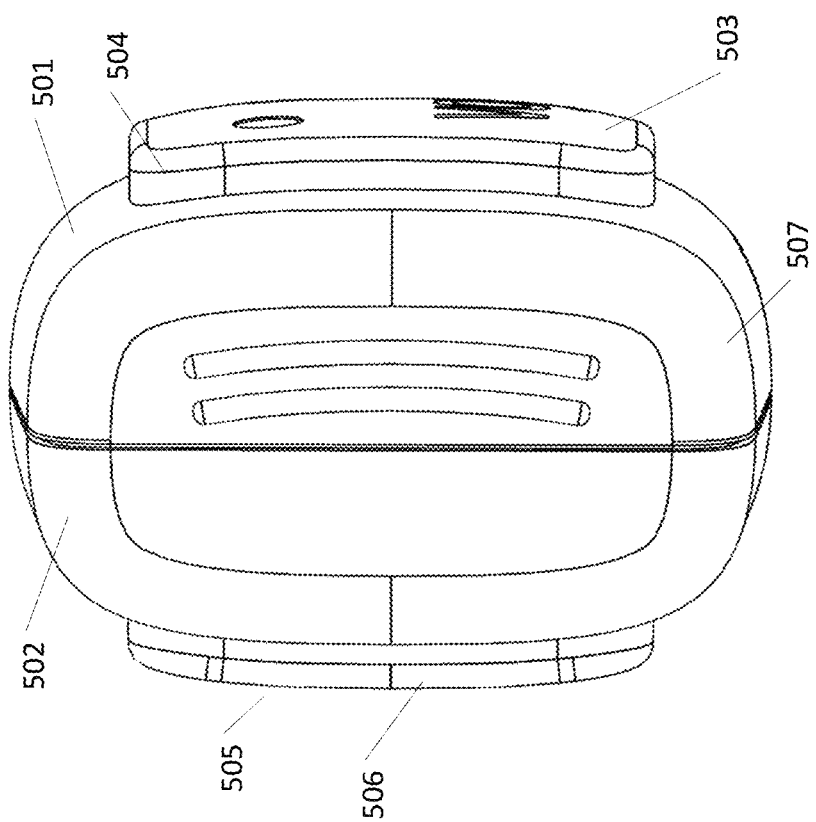
Figure 6E:
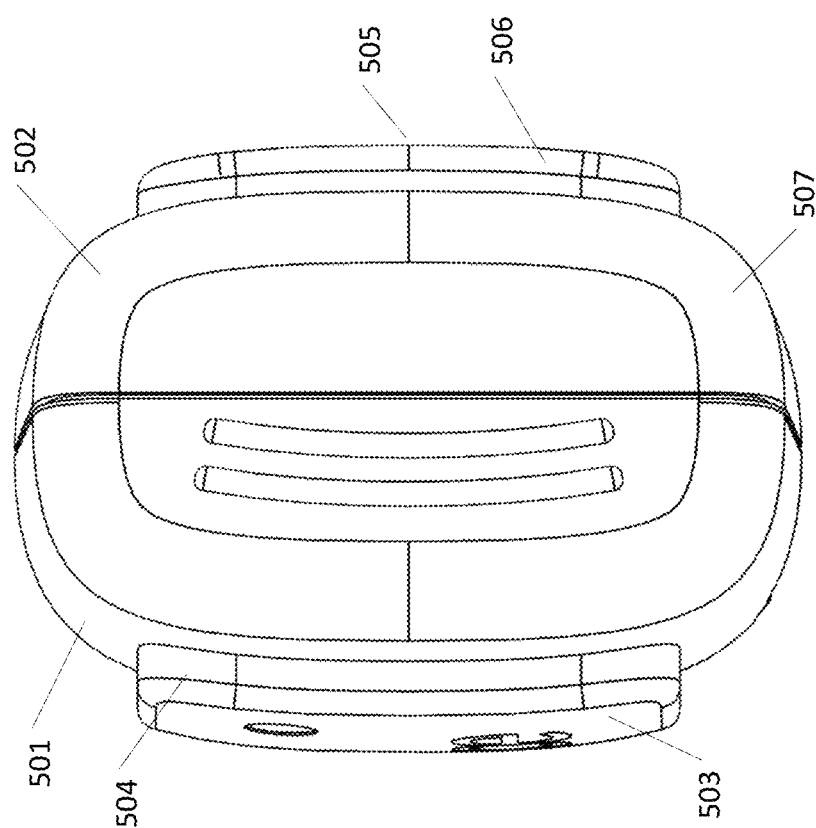

FIGS. 6A-6F depict various perspectives of the electronics module. FIG. 6A shows a front perspective with the front portion 501, the raised portion 503, ends 507 and 509, and the edge 504. FIG. 6B shows a rear perspective with the rear portion 502, a raised portion 505, ends 507 and 509, and an edge 506. FIG. 6C shows a top perspective with the front portion 501, the rear portion 502, the raised portions 503 and 505, ends 507 and 509, and edges 504 and 506. FIG. 6D shows a bottom perspective with the front portion 501, the rear portion 502, the raised portions 503 and 505, ends 507 and 509, and edges 504 and 506. FIG. 6D further shows an optional portion 510 that may be raised and provide a further positioning capability in an aperture in a bottom panel (e.g., in panels 104 or 304) and/or an access panel to the module (e.g., providing access to a removable storage device and the like). FIG. 6E shows a side perspective with the front portion 501, the rear portion 502, the raised portions 503 and 505, ends 507 and 509, and edges 504 and 506. FIG. 6F shows a side perspective opposite that of FIG. 6E with the front portion 501, the rear portion 502, the raised portions 503 and 505, ends 507 and 509, and edges 504 and 506.

Figure 7B:
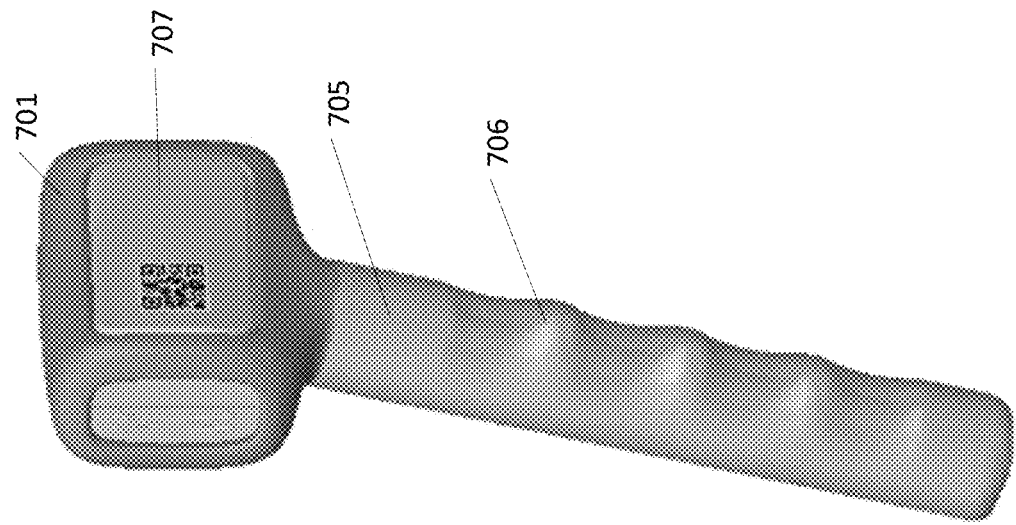
FIGS. 7A-7B show a third embodiment of a portion of a flexible structure configured to position the insertable module.
Figure 7A:
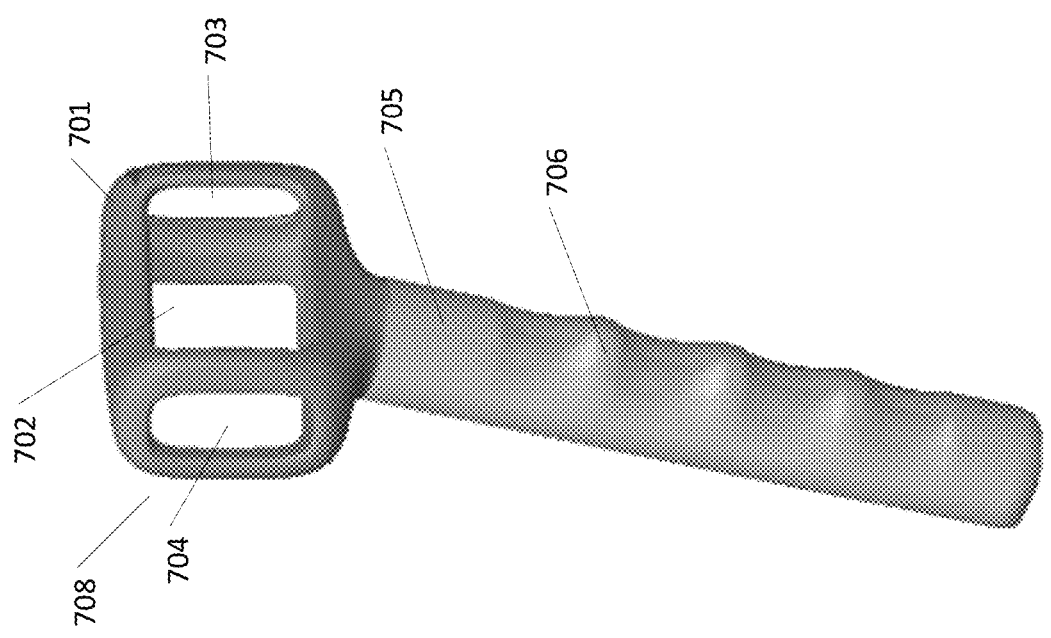

FIGS. 7A and 7B show a third embodiment of a portion of a flexible structure configured to position the insertable module. The flexible structure of FIG. 7A may comprise an elastomeric frame 701 that may be elastically deformed to permit insertion and/or removal of an electronics module. The elastomeric frame 701 may comprise at least one aperture to permit insertion of the electronics module. For example, the at least one aperture may be on side of the elastomeric frame 701 (e.g., at a front 702, a first side 703, a second side 704, and/or a rear 708 of the elastomeric frame 701). The aperture may further be in the top of the elastomeric frame 701. The elastomeric frame 701 may be attached to a rod 705. The rod 705 may include raised portions 706 to permit a user to better grip the rod 705 and aim the electronics module contained within the elastomeric frame 701. FIG. 7B shows an electronics module 707 positioned within the elastomeric frame 701.

Figure 8B:
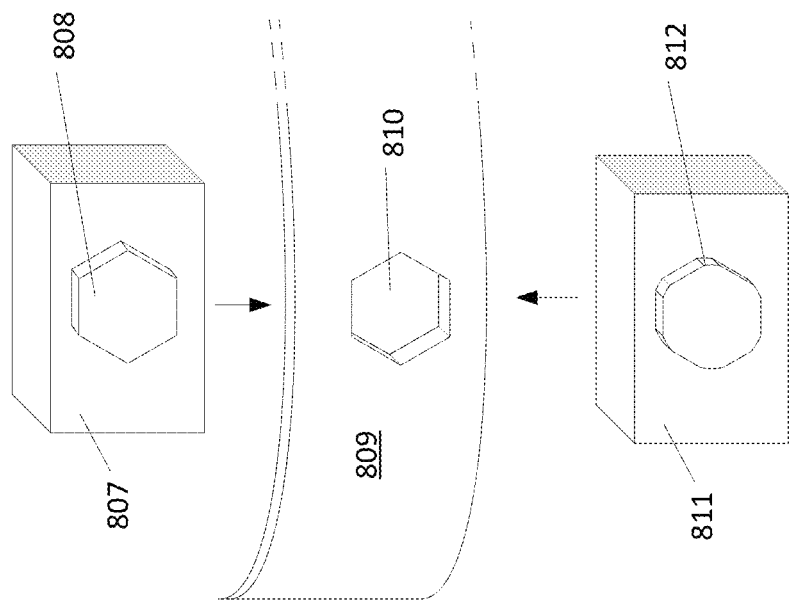
FIGS. 8A-8B show various configurations of the flexible structure for positioning the insertable module.
Figure 8A:
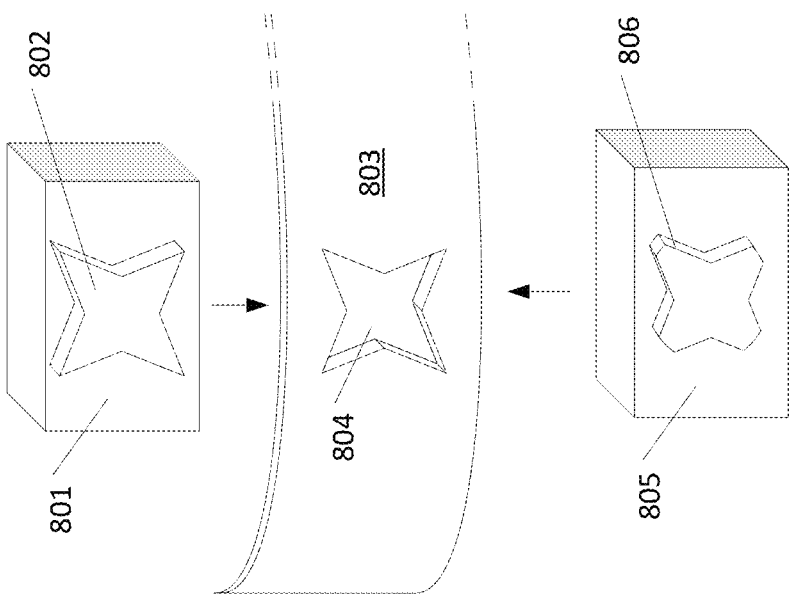

FIGS. 8A-8B show various configurations of the apertures in the first strap 101/301, the second strap 102/302, and/or in the elastomeric frame 701 for positioning the insertable electronics module. FIG. 8A shows an electronics module 801 with a raised portion 802. The strap 803 (either the first strap or second strap or each of the first and second straps) may comprise an aperture 804 with one or more interior surfaces configured to engage one or more exterior surfaces of the raised portion 802. In one example, the raised portion 802 comprises a five point star and the aperture 804 comprises a reciprocal shape of the five point start, such that the outer sides of the raised portion 802 engages with the corresponding inner surfaces of the aperture 804. Additionally or alternatively, less than all surfaces of the raised portion may contact the inner surfaces of the aperture. For example, electronics module 805 includes a raised portion 806 where each point of the five point star has been truncated. While the interior portions of the periphery of the raised portion 806 may contact the interior surfaces of the aperture 804, the end portions of the truncated points do not. Further, the raised portions may or may not be symmetric. One benefit of having non-symmetric raised portions is to prevent the accidental inverted insertion of the electronics module in the enclosure formed by the straps or in the enclosure (of FIGS. 7A and 7B) itself.

FIG. 8B shows a similar example of an electronics module 807 having a hexagonal raised portion 808 fitting all interior surfaces 810 of a strap 809. FIG. 8B includes another electronics module 811 having a truncated hexagonal raised portion. While the flat surfaces of the truncated raised portion 812 may contact some of the interior surfaces of the aperture 810 of the strap 809, the truncated ends of the hexagonal raised portion 812 may not.

While FIGS. 8A and 8B have been described with respect to the strap, it is appreciated that the strap may be a first strap, a second strap, and/or both straps as described herein. Further, the apertures of FIGS. 8A and 8B may be used in the enclosures of FIGS. 7A and 7B to position the electronics module.

Figure 9B:
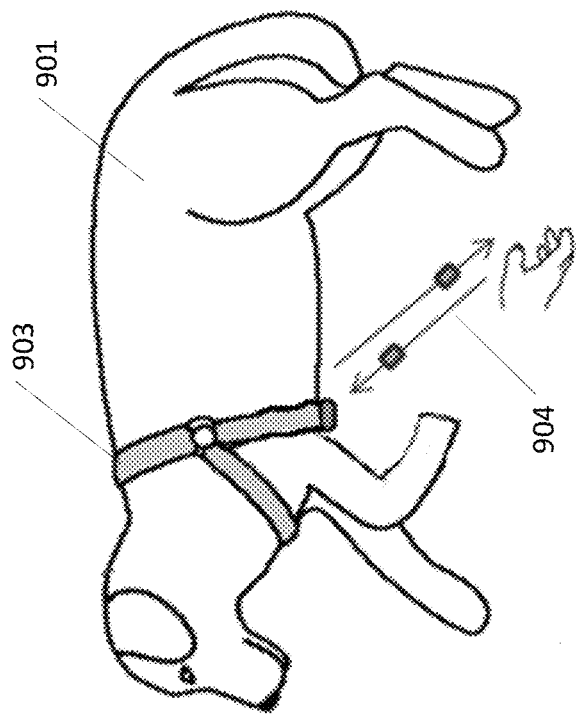
FIGS. 9A-9B show various configurations of attachment systems for a module to a subject.
Figure 9A:
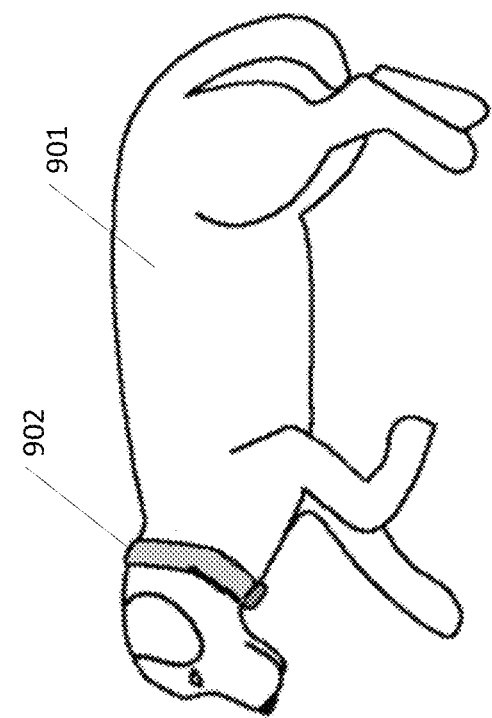

FIGS. 9A-9B show various configurations of attachment systems for a module to a subject. FIG. 9A shows an example of the straps in a collar formation. A subject 901 is wearing a collar 902 around its neck. FIG. 9B shows an example of the straps in a harness formation. A subject 901 is wearing a harness 903 with the module proximate the subject 901's chest. FIG. 9B also shows the module being added to the enclosure formed by the straps and later removed via user interaction 904.

Figure 10:
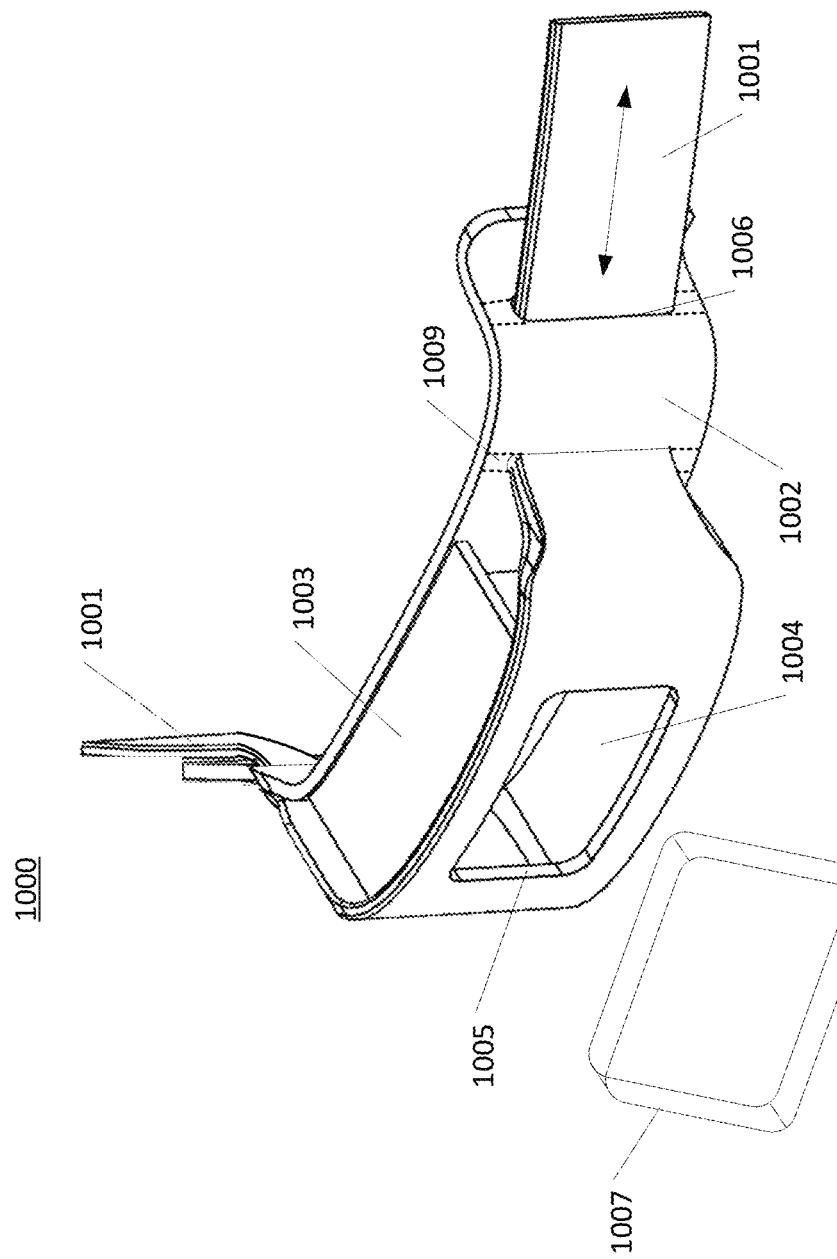
FIG. 10 shows an example of one strap attached to another strap.

FIG. 10 shows an example of one strap attached to another strap. A first strap 1001 is shown passing through a second strap 1002. In one example, the second strap 1002 may be formed of an elastic material with stretchable holes 1006 and 1009 that may be stretched to permit an end of the strap 1001 to be passed through the holes. In the example of FIG. 10, the second strap 1002 may contain a number of holes 1006 and 1009 on one or more sides of an enclosure for holding a module. Upper and/or lower panels 1003 and 1004 may be attached to the second strap 1002, to the first strap 1001, or both the first strap 1001 and the second strap 1002. In FIG. 10, the first strap 1001 may include an aperture 1005. Additionally or alternatively, the second strap 1002 may include an aperture as well. Edges of the aperture 1005 may be sufficiently stable to hold the raised edges of a module. Additionally or alternatively, an insertable ring may be fixedly attached to the strap with aperture 1005 to prevent the dimensions of aperture 1005 from changing as the subject moves about. For instance, the ring 1007 may be glued to the inner surface of the aperture 1005 or attached by similar means include ultrasonic welding, stitching, and the like. Further, ring 1007 may include extra flanges to improve the contactable surface area between ring 1007 and the strap. Further, the strap may be a multi-layer strap with the ring 1007 positioned between the layers.

The second strap 1002 may include holes to permit threading of the first strap 1001 through them to form the enclosure for holding the module. Additionally or alternatively, the second strap 1002 may include notches in lieu of holes (e.g., shown by dashed lines above and/or below the holes 1006 and 1009). The notches may be placed on the same or opposite sides of the second strap 1002. Placing the notches on opposite sides of the strap 1002 may permit the strap 1002 to be more intertwined with the first strap, thereby providing a more secure connection between the first strap 1001 and the second strap 1002.

Figure 11A:
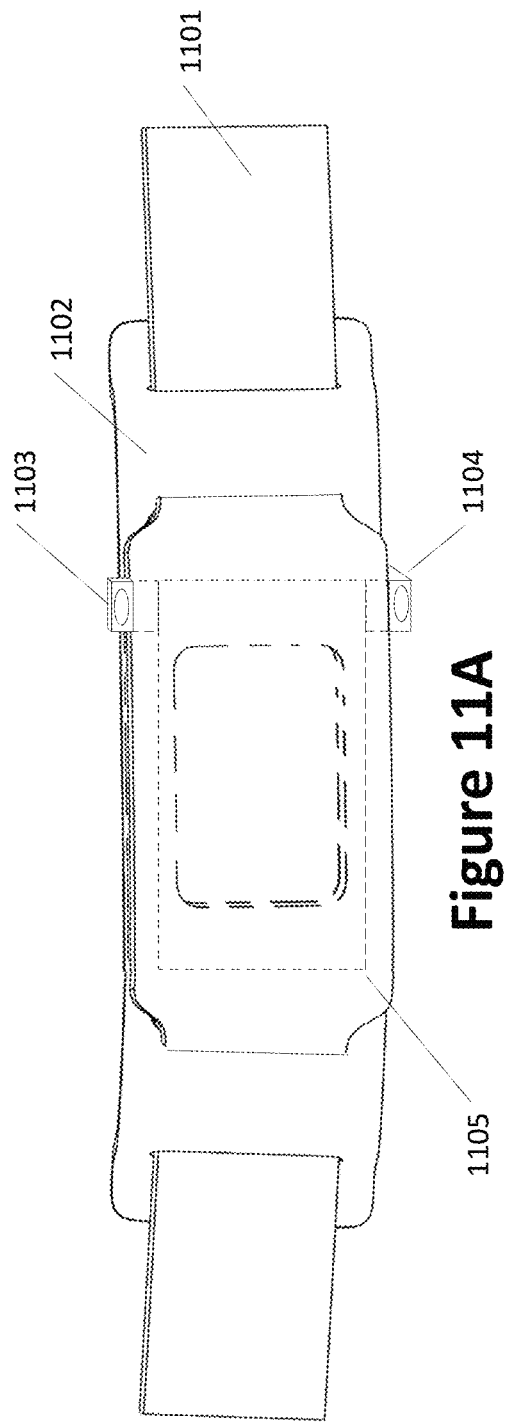
FIGS. 11A-11B show examples of a module with one or more portions extending beyond an enclosure formed by straps.
Figure 11B:
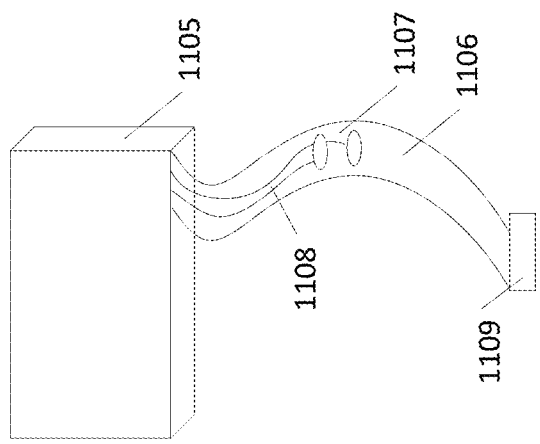

FIGS. 11A-11B show examples of a module with one or more portions extending beyond an enclosure formed by straps. In FIG. 11A, a first strap 1101 is provided and attached to a second strap 1102. The second strap 1102 includes holes through which the first strap 1101 is threaded. While the second strap 1102 may include an aperture to allow the module to face the subject's body, the size of the first strap 1101 may be larger than the height of the body of the module. If the first strap 1101 lacks an aperture, it may prevent one from visually inspecting any indicator lights on the module. FIG. 11A shows one or more projections 1103 and 1104 extending beyond the height of the body of the module 1105. Indicator and/or status lights may be located on the projections 1103 and/or 1104 to permit one to view the status of the module while the majority of the module 1105 is hidden behind the first strap 1101.

FIG. 11B shows a further embodiment of the module 1105. The module 1105 may include a band 1106 containing one or more status or indicator lights 1107 that are connected to the body of the module via electrically conductive leads 1108. The leads may be embedded in the strap, be arranged on its surface, and the like. The band 1106 may further include a securing structure 1109 for securing the band 1106 to one or more of the first strap 1101 and/or the module 1105. The securing structure may include, but is not limited to, a buckle, a clasp, hook and loop attachment system, or other attachment techniques to maintain the position of the band 1106 outside of the first strap 1101.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a first strap;
a second strap comprising a first end and second end, wherein the first end is fixedly attached to the first strap;
a first panel fixedly attached to each of the first strap and the second strap; and
a second panel fixedly attached to each of the first strap and the second strap,
wherein the first strap and the second end of the second strap are configured to move relative to each other, and
wherein a space between the first panel, the second panel, the first strap, and the second strap form an enclosure.

2. The apparatus of claim 1,
wherein at least one of the first strap or the second strap comprises an aperture.

3. The apparatus of claim 2,
wherein the aperture is configured to receive a raised portion of a module.

4. The apparatus of claim 1,
wherein the second strap further comprises at least two apertures, and
wherein the first strap is configured to pass through the at least two apertures.

5. The apparatus of claim 1,
wherein the first strap comprises a first aperture, and
wherein the second strap comprises a second aperture.

6. A system comprising:
a first strap;
a second strap comprising a first end and second end, wherein the first end is fixedly attached to the first strap, wherein the second strap further comprises at least a first aperture and a second aperture; and
a module configured to be held between the first strap and the second strap,
wherein the first strap is configured to pass through the first aperture of the second strap.

7. The system of claim 6,
wherein the module comprises a first surface and a raised portion on the first surface, and
wherein the second aperture of the second strap is configured to receive the raised portion of the module.

8. The system of claim 7,
wherein the first strap and the second end of the second strap are configured to move relative to each other.

9. A system comprising:
a first strap;
a second strap comprising a first end and second end, wherein the first end is fixedly attached to the first strap;
a module configured to be held between the first strap and the second strap;
a first panel fixedly attached to each of the first strap and the second strap; and
a second panel fixedly attached to each of the first strap and the second strap,
wherein a space between the first panel, the second panel, the first strap, and the second strap form an enclosure, and
wherein the enclosure is configured to hold the module.

10. The system of claim 8,
wherein the module comprises a second surface with a second raised portion,
wherein the first strap comprises a third aperture configured to receive the second raised portion.

* * * * *